(12) United States Patent
Wojtowicki (10) Patent No.: US 8,079,442 B2
(45) Date of Patent: Dec. 20, 2011

(54) ACOUSTIC BAFFLE

(75) Inventor: Jean-Luc Wojtowicki, Pouilly sur Loire (FR)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 12/701,902

(22) Filed: Feb. 8, 2010

(65) Prior Publication Data

US 2010/0320028 A1   Dec. 23, 2010

Related U.S. Application Data

(63) Continuation of application No. PCT/EP2007/007234, filed on Aug. 16, 2007.

(51) Int. Cl.
*F01N 1/08* (2006.01)
*F01N 1/02* (2006.01)
*F16J 15/02* (2006.01)
*F01N 1/00* (2006.01)
*F02B 77/13* (2006.01)
*F16J 15/00* (2006.01)

(52) U.S. Cl. .................. 181/264; 181/204; 296/187.02; 277/630

(58) Field of Classification Search .................. 181/264, 181/204, 281, 207, 208, 272, 269; 296/187.02, 296/205, 187.01, 203.01; 277/630, 628, 277/650, 916

See application file for complete search history.

(56) References Cited

U.S. PATENT DOCUMENTS

| | | | | | |
|---|---|---|---|---|---|
| 1,084,883 | A | * | 1/1914 | Holzwarth | 181/264 |
| 2,598,756 | A | * | 6/1952 | Brightly, Jr. et al. | 181/245 |
| 3,029,895 | A | * | 4/1962 | Lyon | 181/264 |
| 3,851,724 | A | * | 12/1974 | Banks, Jr. | 181/208 |
| 4,393,631 | A | * | 7/1983 | Krent | 52/144 |
| 4,467,887 | A | * | 8/1984 | Vizard | 181/265 |
| 4,901,395 | A | * | 2/1990 | Semrau | 16/2.2 |
| 5,444,195 | A | * | 8/1995 | Dojo | 181/208 |
| 5,621,701 | A | * | 4/1997 | Denaro et al. | 367/151 |
| 5,642,914 | A | * | 7/1997 | Takabatake | 296/187.02 |
| 6,114,004 | A | * | 9/2000 | Cydzik et al. | 428/81 |
| 6,146,565 | A | * | 11/2000 | Keller | 264/46.5 |

(Continued)

FOREIGN PATENT DOCUMENTS

DE   3347827 A1 *   3/1985
(Continued)

OTHER PUBLICATIONS

International Search Report dated May 2, 2008, International Application PCT/EP2007/007234.

*Primary Examiner* — Edgardo San Martin
(74) *Attorney, Agent, or Firm* — Mary K. Cameron (57) ABSTRACT

A heat expandable baffle for sealing automotive cavities comprising a carrier plate with an outer perimeter and a strand of a heat expandable material along the major part of the outer perimeter, this strand circumscribing a central section of the carrier plate which is not covered by the heat expandable material, the outer perimeter defining a mean plane limited by the outer perimeter, the central section of the carrier plate being bent away from the mean plane in a way that the point on the central section which has the greatest distance from the mean plane lies at a distance from the mean plane which is at least 5% of the maximum linear length of the carrier plate, and/or the central section having a lumped mass distribution.

29 Claims, 7 Drawing Sheets

U.S. PATENT DOCUMENTS

| | | | |
|---|---|---|---|
| 6,347,799 B1 * | 2/2002 | Williams et al. | 277/316 |
| 6,382,635 B1 * | 5/2002 | Fitzgerald | 277/630 |
| 6,413,611 B1 * | 7/2002 | Roberts et al. | 428/99 |
| 6,478,110 B1 * | 11/2002 | Eatwell et al. | 181/207 |
| 6,619,727 B1 * | 9/2003 | Barz et al. | 296/187.02 |
| 6,641,208 B2 * | 11/2003 | Czaplicki et al. | 296/187.02 |
| 6,649,243 B2 * | 11/2003 | Roberts et al. | 428/99 |
| 6,988,585 B2 * | 1/2006 | Mourieras et al. | 181/204 |
| 7,261,182 B2 * | 8/2007 | Zainea | 181/293 |
| 7,364,221 B2 * | 4/2008 | Tahri et al. | 296/187.02 |
| 7,395,898 B2 * | 7/2008 | Yang et al. | 181/286 |
| 7,422,088 B2 * | 9/2008 | Ito | 181/198 |
| 7,621,373 B2 * | 11/2009 | Helferty | 181/268 |
| 7,823,693 B2 * | 11/2010 | Boyce | 181/284 |
| 2004/0201258 A1 * | 10/2004 | Daniere et al. | 296/203.02 |
| 2004/0239148 A1 * | 12/2004 | Ratet | 296/187.02 |
| 2005/0082111 A1 * | 4/2005 | Weber | 181/204 |

FOREIGN PATENT DOCUMENTS

| | | |
|---|---|---|
| EP | 1657708 A1 | 5/2006 |
| EP | 1593588 B1 | 1/2008 |
| JP | 58202321 A * | 11/1983 |
| WO | WO 9937506 A1 * | 7/1999 |
| WO | 0192063 A1 | 12/2001 |
| WO | WO 2007146726 A2 * | 12/2007 |

* cited by examiner

ACOUSTIC BAFFLE

This application is a continuation under 35 U.S.C. Sections 365(c) and 120 of International Application No. PCT/EP2007/007234, filed Aug. 16, 2007 and published on Feb. 19, 2009 as WO 2009/021537, which is incorporated herein by reference in its entirety.

FIELD OF THE INVENTION

The present invention relates to acoustically active and sealing baffles in the cavities of structural components of vehicles.

BACKGROUND OF THE INVENTION

Modern vehicle concepts and structural designs of vehicles have a plurality of cavities which have to be sealed in order to prevent the ingress of moisture and contaminants, since the latter can result in corrosion from the inside on the corresponding body parts. This applies, in particular, to modern self-supporting body constructions in which a heavy frame construction is replaced by so-called "space frames". With the latter, use is made of a lightweight, structurally solid chassis made of prefabricated hollow sections. Such constructions have, depending upon the specific system, a number of cavities which have to be sealed against the penetration of moisture and contaminants. These cavities include the upwardly extending A-, B- and C-pillars supporting the roof structure, the roof rail, portions of the fenders, or the sill. In addition, these cavities transmit airborne sound in the form of unpleasant vehicle running noises and wind noises. Therefore, such sealing measures also serve to reduce the noises and to enhance the comfort of traveling in the vehicle.

During the assembly of the car, these frame parts and body parts containing cavities are prefabricated from half-shell components which were joined at a later time by welding and/or adhesive bonding so as to form the closed hollow section. Within this specification, such half-shell components after joining are called "interconnected walls", which surround the enclosed hollow section ("cavity"). With such a type of construction the cavity in the early body in white ("body shop") state of a vehicle body is accordingly easily accessible, so that sealing and acoustically damping parts (sometimes referred to as "pillar fillers" or "cavity filler inserts") can be fixed in this early phase of body construction by mechanical hanging, by insertion into appropriate holding devices, bores or by gluing or welding to the cavity walls.

Most modern baffles are designed to include a sealing material disposed on a support member or carrier. The carrier is generally manufactured from a rigid material, such as hard plastic, such that its shape approximates the shape of the cavity to be sealed. The carrier/sealing material combination is configured such that the carrier is inserted into a cavity. Typically, the sealing material is activated (thermally or chemically) to expand (or "foam") after insertion into the cavity so that the sealing material forms a seal with the walls of the cavity. Thus, the expanded sealing material creates an airtight seal between the carrier and the walls of the cavity.

From WO 99/37506 a cavity sealing article is known which comprises a planar support member and a sealing member comprising a foamable polymer which surrounds in an intimate contact the support member and which is in plane with the support member. The foamable polymer comprises at least two layers which are in intimate contact and which are in the plane of the support member. The outer most layer of the sealing member comprises an un-cross linked foamable polymer and the inner layer comprises a cross linked foamable polymer.

WO 00/03894 A1 discloses a lightweight expandable baffle for sealing a cavity of a vehicle body at a predetermined cross section of the cavity. This baffle includes a rigid support plate having an outer periphery with a shape generally corresponding to but smaller than the shape of the cross section of the cavity. Said baffle comprises a heat expandable sealing material mounted to the outer periphery of the rigid support plate having an activation temperature range at which the material expands. The support plate is being formed of a material having a higher melting point than the activation temperature range of the sealing material. When activated, the sealing material expands radially from the rigid support plate to fill the cross-sectional cavity between the rigid support plate and the cavity walls.

WO 01/83206 A1 discloses a combined baffle and reinforcing assembly for use within the cavity of a structural member to dampen acoustic transmissions through the cavity and to provide reinforcement in a direction transverse to the longitudinal axis of the structural member. The combined assembly includes a synthetic carrier which comprises an interior area, a marginal rim and an attachment member preferably in a form of a clip suited for insertion to the corresponding hole in the wall of the structural member. The carrier is circumscribed by a continuous band of reinforcing material extending around the periphery of the carrier. The marginal rim of the carrier may include a base wall and a support flange for receiving the thermally expandable material thereon.

WO 01/71225 describes an expandable baffle part for sealing cavities in automobiles. This part comprises a thermally expandable sealing material that is able to expand at the temperatures of the e-coat bake oven. Moreover, the baffle part comprises a support which positions and fixes the expandable material at the predetermined point in the cavity until the thermal expansion sets in. The support further has at least one clip or a snap-action or plug-in device which is inserted under pressure into a corresponding bore or aperture in the hollow-space structure in order to fix the component.

In baffles according to the state of the art, the carrier for the thermally expandable sealing material is usually plate-like and flat. The baffle is inserted into the longitudinal cavity in a way that the plane of the carrier lies perpendicular to the longitudinal axis of the cavity, so that the cavity is bisected by the baffle.

Contrary to baffles, U.S. Pat. No. 4,901,395 describes a grommet for mounting in an opening in a compartment wall and including an elastomeric body having a passage therethrough for passing an elongated member through the compartment wall, such grommet comprising:

an axially extending central tubular portion of diameter less that the diameter of the compartment wall opening;
  a flange portion integral with the central tubular portion and having a diameter greater than the diameter of the compartment wall opening to limit the extent of insertion of the central tubular portion into the compartment wall opening;
  a retention means integral with the central tubular portion in axial spaced relation from the flange portion, said retention means having a free state dimension greater than the diameter of the central tubular portion and being yieldable to permit insertion of the tubular portion through the compartment wall opening and then returning to the free state condition to retain the grommet in loose fitting relation to the compartment wall;

and an annular ring of heat expandable material carried by the grommet, said annular ring expanding in response to occurrence of predetermined heat condition to fill the space between the grommet and the compartment wall and thereby seal the compartment wall opening.

This grommet is different from the baffle of the present invention in at least the following aspects: The grommet is configured for sealing a (essentially two-dimensional) hole in a wall, not for sealing a (essentially three-dimensional) usually longitudinal cavity formed by interconnecting walls. It does not comprise a carrier plate (which is a flat object), but is an essentially three-dimensional object. The expandable material is not disposed along the outer perimeter of the plate, as it is the case for a baffle, but is essentially placed around the thinnest section of the grommet. The grommet has at least one flange portion which is larger than the opening to be sealed, whereas the baffle is essentially inside the cavity to be sealed, with the possible exception of fasteners which may penetrate a wall of the cavity for fixing the baffle prior to expanding the heat expandable material.

While the above mentioned baffles have been successfully employed to seal automotive body cavities against the intrusion of dust, water, carbon monoxide and to a certain extent noise, a need exists for an improved baffle with enhanced sound suppression capability.

SUMMARY OF THE INVENTION

The solution to this problem as provided by the invention is defined in the claims and consists essentially in providing a heat expandable baffle for sealing automotive cavities formed by interconnected walls, to be fixed essentially inside the cavity to be sealed, with the possible exception of fasteners which may penetrate a wall of the cavity for fixing the baffle prior to expanding the heat expandable material, the baffle comprising a carrier plate with an outer perimeter and a strand of a heat expandable material (also called "thermally expandable material" or "foamable material") along the major part of the outer perimeter, this strand circumscribing a central section of the carrier plate which is not covered by the heat expandable material, the outer perimeter defining a mean plane limited by the outer perimeter, the central section of the carrier plate being bent away from the mean plane in a way that the point on the central section which has the greatest distance from the mean plane lies at a distance from the mean plane which is at least 5% of the maximum linear length of the carrier plate, and/or the central section having a lumped mass distribution. Preferably, the strand of the heat expandable material is disposed along at least 80%, more preferably 90% of the outer perimeter of the carrier plate. Usually, the strand of the heat expandable material is disposed along the complete outer perimeter of the carrier plate. Preferably, the baffle comprises a support structure along the outer perimeter, said support structure holding the strand of the heat expandable material.

It is an object of the invention to provide a heat expandable baffle for sealing automotive cavities formed by interconnected walls, to be fixed essentially inside the cavity to be sealed, with the possible exception of fasteners which may penetrate a wall of the cavity for fixing the baffle prior to expanding the heat expandable material, the baffle comprising: a carrier plate having a linear length, an outer perimeter defining a mean plane limited by the outer perimeter and a strand of a heat expandable material laid along a major part of the outer perimeter, said strand circumscribing a central section of the carrier plate, said central section not being covered by the heat expandable material; wherein the central section of the carrier plate:

a. extends out of the mean plane such that a point on the central section that is furthest from the mean plane lies at a distance from the mean plane which is at least 5% of a maximum of said linear length of the carrier plate, and/or b. the central section has a mass and an uneven mass distribution.

In one embodiment, the central section of the carrier plate extends out of the mean plane in such a way that the point on the central section which has the greatest distance from the mean plane lies at a distance from the mean plane which is at least 5%, but not more than 50% of the maximum linear length of the carrier plate.

In one embodiment, the central section of the carrier plate extends in a direction out of the mean plane such that a vault-like structure is formed.

In some embodiments, the central section has a center of gravity and the uneven mass distribution of the central section is such that a part of the mass of the central section is concentrated around: the center of gravity of the central section or, if the center of gravity of the central section lies outside of the carrier plate, at a point on the carrier plate which is closest to the center of gravity of the central section. Desirably, the concentrated part of the mass of the central section is 2% to 50% of the mass of the central section of the carrier.

In one embodiment, the heat expandable material has a damping factor of 0.2 to at least 1 in expanded form.

In some embodiments, the baffle further comprises a support structure along the outer perimeter, said support structure holding the strand of the heat expandable material. In one embodiment, the support structure of the carrier plate includes a radial groove in which the heat expandable material is received. In another embodiment, the support structure of the carrier plate includes a radial flange to which the heat expandable material is mounted. In yet another embodiment, the heat expandable material is integrally molded to the support structure of the carrier plate.

In one embodiment, the carrier plate is made of a thermoplastic having a melting point higher than the expansion temperature of the heat expandable material.

DETAILED DESCRIPTION OF THE INVENTION

Figure 1:
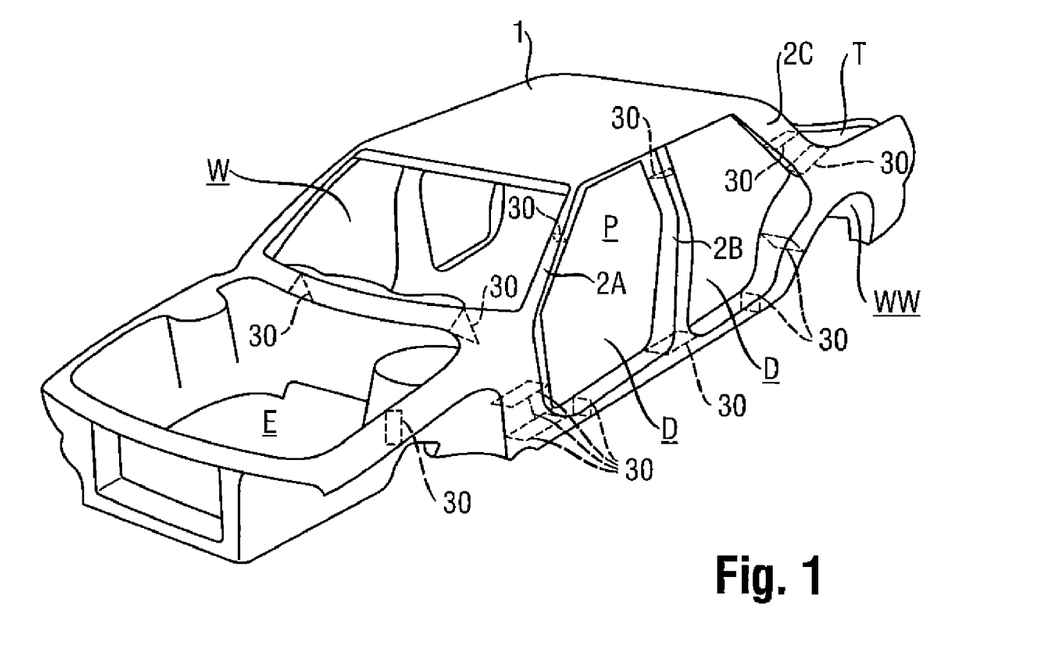
FIG. 1 is a perspective view of an automobile body frame.

An automotive cavity is formed by interconnected walls (e.g. two prefabricated half-shells joined together) and has a three-dimensional extension, usually in the form of a straight or bent channel. Examples of such cavities are the hollow spaces within the pillars or other support frames of a vehicle. FIG. 1 shows some locations where baffles (30) may be mounted into cavities of a car body. A (essentially two-dimensional) hole in a sheet is not a cavity in the sense of this invention. The baffle is located essentially completely inside the cavity, with the possible exception of fasteners which may penetrate a wall of the cavity for fixing the baffle prior to expanding the heat expandable material. Contrary to a grommet as described in U.S. Pat. No. 4,901,395, a baffle does not exhibit a flange portion with a diameter greater than the "opening" to be sealed, as it has to fit essentially completely inside the cavity, with the possible exceptions of fasteners which are small compared with the complete baffle.

A plate is defined as a structure having a thickness in a direction of minimum extension (called the "perpendicular plate axis") which is at most 10% of the length of the structure in the direction of its maximum length, and at most 25% of the minimum width of the structure in a direction perpendicular to the "perpendicular plate axis". ideally, the plate is flat, with the exception of the support structure which might stick out of the plate. In the sense of one embodiment of this invention, however, the central section of the carrier plate is bent to form a vaulted or "bowl-like" structure, so that the plate has a convex "upper" and a concave "lower" surface. Instead of or in addition to this bent or vaulted structure, the plate may exhibit a lumped mass distribution. This means that the mass of the plate is not distributed equally, but a part of the mass is concentrated around one or more selected points. Especially, the mass may be concentrated around the centre of gravity of the plate or, if the plate is bent, around the point on the plate which is closest to the centre of gravity of the bent structure. The grommet described in U.S. Pat. No. 4,901,395 is not a plate, but a three-dimensional object.

The mean plane formed by the outer perimeter of the carrier plate is defined as the least squares plane through six points on the perimeter of the carrier plate, two of these points being located at opposite ends of the line spanning the longest extension of the carrier plate, and the remaining four points lying at the intersection of two further lines with the perimeter of the carrier plate, these two further lines forming angles of 60° and 120° with the line spanning the longest extension of the plate, and intersecting this line at its midpoint. The least squares plane through six points is the plane which is oriented in such a way that the sum of the squares of the perpendicular distance of each of these points from the plane is minimal. Only the carrier plate, without the support structure, is taken for the definition of the mean plane. The six points which define the mean plane are supposed to lie on the outer perimeter of the carrier plate at half the thickness of the carrier plate at the outer perimeter. This is shown schematically in FIG. 2. Line A-A' spans the longest extensions of the carrier plate 21. Lines B-B' and C-C' intersect line A-A' in its midpoint at an angle of 60° each. The mean plane of carrier plate 21 is the least squares plane through the six points A, B, C, A', B', and C' on the perimeter 23 of the carrier plate, supposed to lie at half the thickness of the plate.

Figure 2:
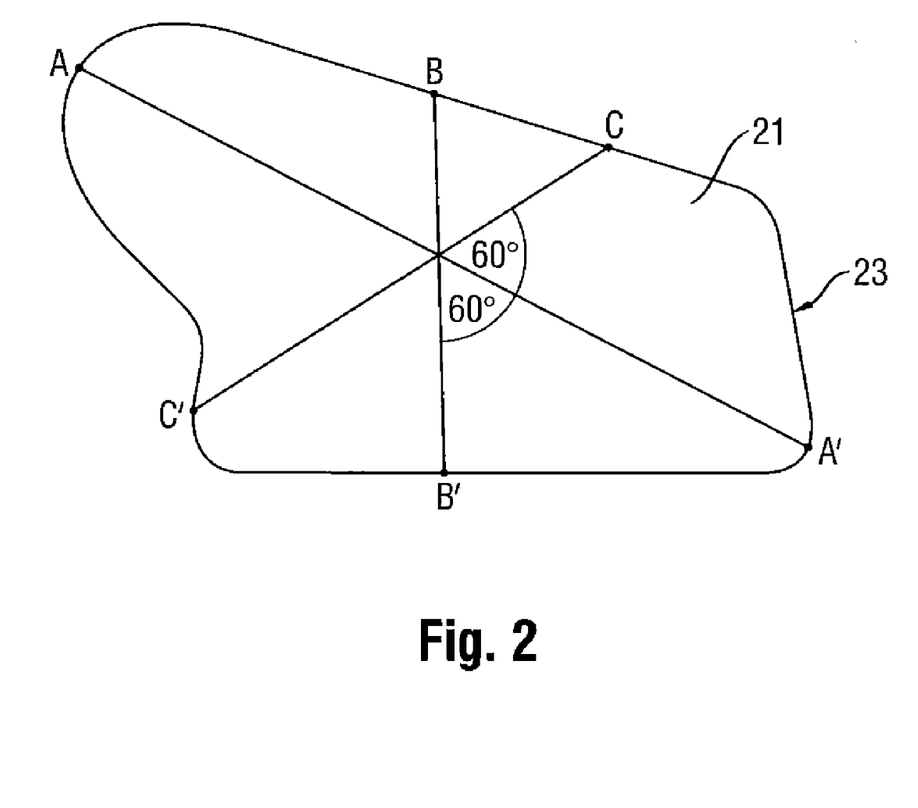
FIG. 2 is a top view schematic drawing of a carrier plate illustrating how the mean plane of the outer perimeter of the carrier plate is defined.

Ideally, but not unusually, the complete outer perimeter of the carrier plate lies within one plane. In this case, also the six points A, B, C, A', B', and C' on the perimeter 23 of the carrier plate all lie within this plane, and the "mean plane" is the plane which contains the complete perimeter of the carrier plate.

In one embodiment of this invention the central section of the carrier plate is formed, e.g. bent, to form a vaulted or "bowl-like" structure, so that the plate has a convex "upper" and a concave "lower" surface. The "upper" surface is the surface pointing away from the mean plane; the "lower" surface is the surface facing the mean plane. Thus, a void volume can be defined which is limited by the lower surface of the bent carrier plate and by the mean plane.

In a preferred embodiment of the present invention the central section of the carrier plate is bent away from the mean plane in such a way that the point on the central section which has the greatest distance from the mean plane lies at a distance from the mean plane which is at least 5%, but not more than 50% of the maximum linear length of the carrier plate. This results in a vault-like structure if the carrier plate has essentially the same thickness everywhere.

In another embodiment of the present invention, the central section of the carrier plate has an uneven ("lumped") mass distribution. This means that the thickness of the carrier plate is different in various locations. Especially, the central section of the carrier plate has a lumped mass distribution (i.e. the greatest thickness) which is located at the centre of gravity of the central section or, if the centre of gravity of the central section lies outside of the plate, at the point on the plate which is closest to the centre of gravity of the central section.

A "lumped mass distribution" in the sense of this invention is defined as an uneven distribution of the mass of the central section of the carrier plate. In a preferred embodiment, 2% to 50%, preferably 5% to 10% of the total mass of the central section of the carrier plate is "lumped" (aggregated) in the central section of the carrier plate. This means that the mass of those parts of the central section of the carrier plate which have a thickness which is greater than the average thickness is by 2% to 50%, preferably by 5% to 10% larger than it would be if the mass distribution of the central section of the carrier plate would be uniform.

The carrier plate may be formed from metal or preferably from thermoplastics, in which case the thermoplastics may optionally be fiber-reinforced. Preferred thermoplastics are polyamides, polyimides, polyoxypropylene of polyethylene terephthalate. The thermoplastic should have a melting point higher than the expansion temperature of the heat expandable material. The carrier plate, optionally including the support structure, is preferably made by injection molding. In preferred embodiments, the thermoplastic carrier plate and the heat expandable material are either formed in one co-extrusion process or in subsequent extrusion processes on the same injection molding unit.

In a further preferred embodiment, the baffle comprises at least one attachment member or fastener for securing the baffle in the cavity. Any of the devices known in the art to be capable of securing a carrier bearing an expandable material to the interior wall of a structural member cavity may be utilized as an attachment member in the cavity filler inserts or baffles of the present invention, and the selection of a particular design is not believed to be particularly critical. For example, the attachment member may include two or more resiliently deflectable barbs configured for secured receipt in an opening in the structural member. Each barb may comprise a shank bearing a retaining piece that protrudes at an angle to the shank so as to form a hook. Such an attachment member is inserted into the cavity wall opening with application of minor force, causing the barbs reversibly bend together and towards each other. After the barbs have passed through the opening, they return to their normal position apart from each other. This allows the retaining pieces to engage with the outer surface of the structural member wall around the periphery of the opening, thereby preventing the attachment member from being readily withdrawn through the opening and securing the cavity filler insert within the cavity. Affixing the baffle in this manner so as to prevent it from being easily displaced is highly desirable, since otherwise the handling that the structural member will normally encountered during assembly of the vehicle prior to heating and activating the expandable material is likely to cause the baffle to no longer be properly positioned in the desired location within the cavity.

Other types of attachment members may also be used for this purpose, including, for example, a "Christmas tree"-type fastener (typically fabricated of a resilient plastic) having an elongated poi (Jon with multiple angled flanges. The cavity filler insert or baffle may have one attachment member or a plurality of attachment members, of the same type or different types.

Typically, the attachment member projects radially from the baffle and may be generally parallel to the mean plane of the baffle or in the mean plane of the baffle. Preferably, the attachment members (fasteners) are made of the same material as the carrier plate, and are integrally molded together with the carrier plate in the same injection molding step. The heat expandable material will usually be disposed in a way to surround the basis of the fastener (the section of the fastener which forms the connection with the carrier plate), so that the opening in the carrier wall into which the fastener is inserted will be closed and sealed by the expanded and cured heat expandable material.

The heat expandable material can be made, for example, from ethylene/vinyl-acetate copolymers (EVA), copolymers of ethylene with (meth)acrylate esters, which optionally also contain (meth)acrylic acid incorporated proportionately by polymerization, random copolymers or block copolymers of styrene with butadiene or isoprene or the hydrogenation products thereof. The latter may also be tri-block copolymers of the SBS, SIS type or the hydrogenation products thereof, SEBS or SEPS. In addition, the polymer compositions may also contain cross-linking agents, coupling agents, plasticizers as well as further auxiliary substances and additives.

With a view to achieving a sufficient foaming capacity and expandability, these polymer compositions may also contain blowing agents. Suitable, in principle, by way of blowing agents are all known blowing agents such as, for example, the "chemical blowing agents" which release gases as a result of decomposition or "physical blowing agents", i.e. expanding hollow beads. Examples of the first-mentioned blowing agents are azobisisobutyronitrile, azodicarbonamide, dinitroso pentamethylenetetramine, 4,4'-oxybis(benzenesulfonic acid hydrazide), diphenylsulfone-3,3'-disulfohydrazide, benzene-1,3-disulfohydrazide, p-toluene sufonylsemicarbazide. Examples of the physical blowing agents are expandable plastic hollow microbeads based on polyvinylidene-chloride copolymers or acrylonitrile/(meth)acrylate copolymers, such as are commercially available, for example, under the names "Dualite®" and "Expancel®" from Pierce & Stevens and Casco Nobel, respectively. Preferably, the heat expandable material has an activation temperature above 120° C. and below 200° C.

As a rule, the thermally expandable (heat expandable) material completely surrounds the carrier plate and is preferably located in a U-shaped boundary or radial groove forming the support structure, whereby, as a rule, the thermally expandable material protrudes from the open side of the U-shaped part. However, L-shaped support structures are also possible. Three different non-limiting examples of support structures are shown in FIG. 2.

In the expanded and cured form, the heat expandable material preferably has a loss factor (or damping factor) of 0.2 to 1 and more. The loss factor (also sometimes referred to as the structural intrinsic damping or tan delta) is the ratio of the Young's loss modulus E" over Young's storage modulus E' for the damping in tension compression. For the damping in shear, the loss factor is the ratio of the shear loss modulus G" over the shear storage modulus G'. These values may be readily determined by Dynamic Mechanical Analysis (DMA) of a material, which in the context of this invention is the thermally expandable material after expansion. As is well known in the art, Dynamic Mechanical Analysis can be performed either by an indirect method where the material is characterized on a carrier (Oberst's beam test) or by a direct method where the tested sample is made only from the material to be characterized (viscoanalyzer). Young's storage modulus (E') is defined as the ratio of tensile stress to tensile strain below the proportional limit of a material. Shear storage modulus G' is defined as the ratio of shearing stress to shearing strain within the proportional limit and is considered a measure of the equivalent energy stored elastically in a material.

Preferred embodiments of the heat expandable baffles according to the present invention will now be explained in more detail with the aid of drawings.

An automobile body is illustrated in FIG. 1 and includes several interconnected, hollow frame elements or "pillars" that define the passenger compartment P, the engine compartment E, the trunk T, the door ways D, the windows W and the wheel wells WW. It is common in automotive engineering to refer the pillars supporting the roof by letters with the front side pillars 2A being "A" pillars, the middle side pillars 2B being the "B" pillars and the side rear pillars 2C being the "C" pillars, etc.

Each of the hollow frame elements or pillars encloses a cavity which is formed by the interconnected walls of the pillar. Examples of locations within the cavities of said hollow frame elements or pillars at which a sealing by a baffle may be desired are shown by dotted lines 30. These locations include both horizontal and vertical cavities and may be located at the lower or upper ends of the pillars as well as anywhere in between and in the cavity of the roof railing, door sills and fenders surrounding the wheel wells.

The cross sectional shape of the baffle will be adapted to the cross section of the pillar or hollow frame element, whereby, in the unexpanded and uncured form, the cross section of the baffle carrier plus heat expandable material is smaller than the cross sectional opening of the hollow frame element or pillar. This allows the process fluids like degreasing fluids, phosphating fluids and electro coat paint to flow freely through the hollow frame elements and pillars and wetting their inner walls completely. The heat expandable polymer composition is activated in the e-coat oven (sometimes also referred to as "body-shop oven") during the curing of the electro coat. At this point the heat expandable ribbon expands radially round the perimeter of the baffle, possibly guided by the walls of the support structure, cures and adheres securely to the inner walls of the hollow frame elements or pillars, thereby effectively sealing these hollow elements.

FIG. 2 is a schematic drawing of a carrier plate illustrating how the mean plane of the outer perimeter 23 of the carrier plate 21 is defined. First, a line is drawn which connects those two points A and A' on the perimeter 23 which are as far apart from each other as possible. This is the line AA'. Two further lines are drawn which intersect the line AA' at its midpoint at an angle of 60° each. These intersect the perimeter 23 of the carrier plate 21 at points B and B' and C and C', respectively. The mean plane of the perimeter 23 is defined as the least squares plane through these points, i.e. the plane which is oriented in such a way that the sum of the squares of the perpendicular distance of these six points from the plane is as small as possible. The distance between the points A and A' is the maximum linear length of the carrier plate.

Figures 3, 3A, 3B, 3C:
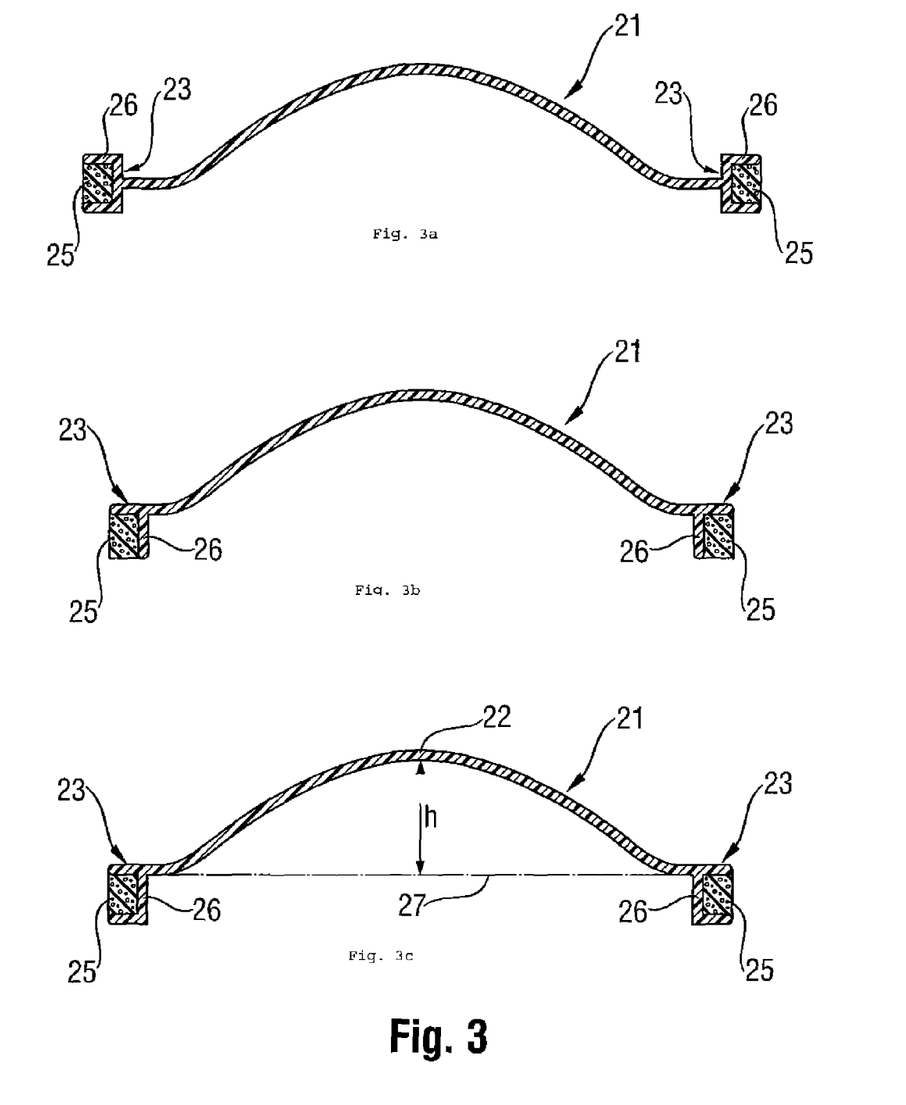
FIG. 3 shows three cross sectional views (3*a*, 3*b* and 3*c*) of three embodiments of the invention having a vaulted carrier plate and different configurations of support structure for the heat expandable material.

FIG. 3 shows cross sections of three embodiments of a baffle with a carrier plate 21 having an outer perimeter 23, the carrier plate 21 being bent away from the mean plane 27 through the outer perimeter so that the point 22 on the central section of the carrier plate with the greatest distance from the mean plane 27 lies at a distance ("height") h above the mean plane. Using this distance h, a "curvature ratio" c can be defined as follows: First, a "hydraulic radius" or "equivalent radius" R is defined. This is the radius of a (theoretical) circle having the same surface area as the central section of the carrier plate, projected onto the "mean plane". The "curvature ratio" in the sense of this invention is an indicator for the deviation of the central part of the carrier from being flat and is defined as the fraction h/R, i.e. the maximum height h above the mean plane, divided by the hydraulic radius R. For a flat baffle, this "curvature ratio" would be c=0, and for a baffle with a circular outer perimeter and with the shape of a half sphere, it would be c=1. The preferred range for the curvature ratio c=h/R is from 0.05 to 0.5 and more preferred greater than 0.2.

Different types of support structures 26 are integrally molded onto the carrier plate 21 to hold the strand of heat expandable material 25. In FIGS. 3a and 3c, the support structures 26 define a substantially "U" shaped area to hold the strand of heat expandable material 25. In FIG. 3b, the support structures 26 define a substantially "L" shaped area to hold the strand of heat expandable material 25. The support structures 26 of FIG. 3b and FIG. 3c extend out of the mean plane 27 in a single direction. In an alternative embodiment, the support structures 26 of FIG. 3a extend out of the mean plane 27 in both directions, the "U" shaped area being on both sides of mean plane 27.

Figure 4:
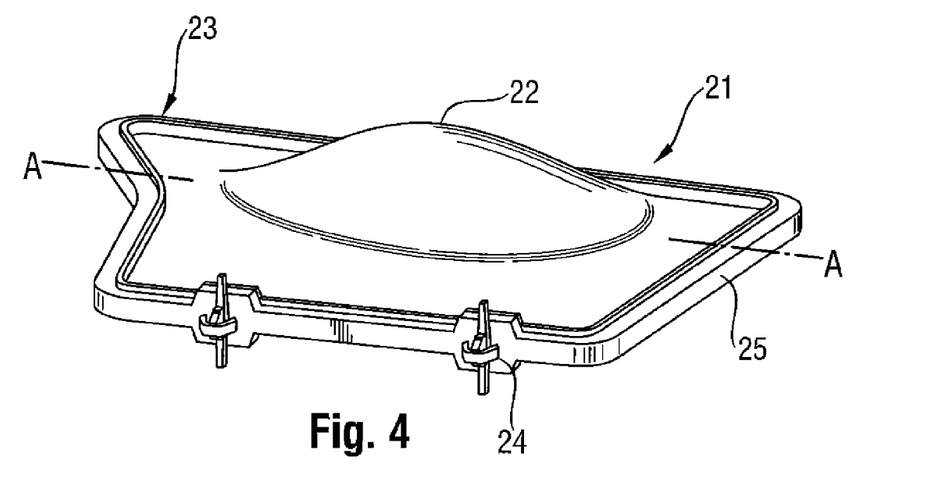
FIG. 4 is a perspective view of a first side of a heat expandable baffle with the non planar shape of the carrier according to the present invention.

FIG. 4 shows a perspective view of one embodiment of the baffle according to the present invention. The carrier 21 may be made from thermoplastic polymer compositions and extends out of the mean plane with the peak 22. The non-planar part of the central portion of the carrier may have the shape of the sphere or of an ellipsoid, preferably an ellipsoid of revolution, or another vault-like shape. The peak 22 may, but need, not coincide with the midpoint of the line AA' defined above.

A support structure may be formed at or near (e.g. at a distance of not more than 2 cm away from) the perimeter 23 of the carrier plate. This support structure, examples of which are shown in FIG. 3, may be a flat "race track" flange which is arranged perpendicular to the plane of the carrier plate 21, a radial flange, or a groove. The peripheral flange portion 23 of the carrier may also be in the form of a U-shaped channel to better secure the heat expandable material 25. Usually, but not necessarily, the carrier plate and the support structure will be made of the same material. If the carrier plate and the support structure are made of the same thermoplastic material, they usually will be formed together in one single injection molding step. Attached to the support structure is the heat expandable material 25 in the form of uniform ribbon or band. It may be integrally molded to the support structure of the carrier plate.

The fasteners 24 are integrally molded with the carrier and protrude through the heat expandable material 25. The fasteners have typically clips in the form of "push pins" to secure the heat expandable baffle in a corresponding hole of the wall of the hollow frame element or pillar.

Figure 5:
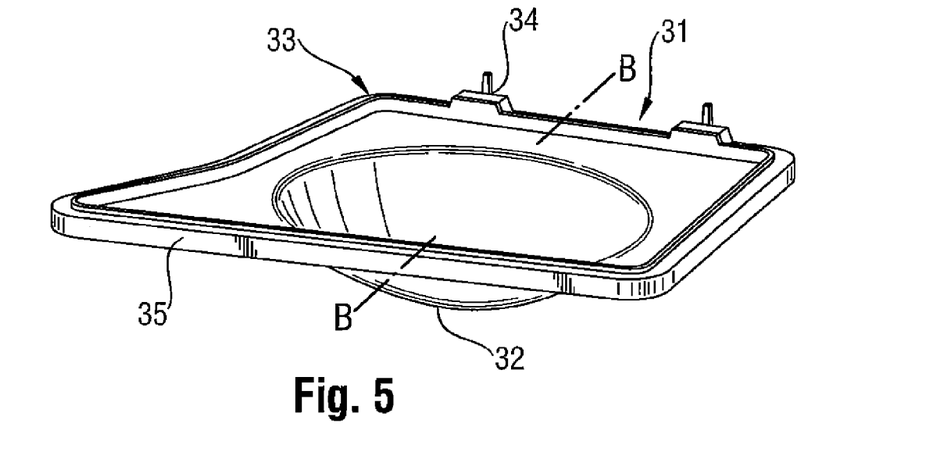
FIG. 5 is another perspective view of a second side of a baffle according to the invention.

FIG. 5 shows an essentially similar embodiment to FIG. 4, it is rotated around the axis A-A in FIG. 4 (which need not coincide with the line AA' of FIG. 2). This baffle also comprises a carrier 31 with a non planar portion extending in the central part 32 in a curved fashion similar to a sphere or ellipsoid. Again the perimeter 33 of the carrier is designed as a flange type structure to hold the heat expandable material 35. The fasteners 34 can be seen in the background of FIG. 5. If the baffle is arranged horizontally in the cavity like in the case of baffles fixed in the vertical pillars 2A, 2B or 2C (cf. FIG. 1), a baffle may be fixed in a position according to FIG. 5. In this case, the central point 32 may have a small hole (not shown in the figure) to allow any condensates from water or process fluids from the manufacturing process of the car to be drained from the baffle.

Figure 6:
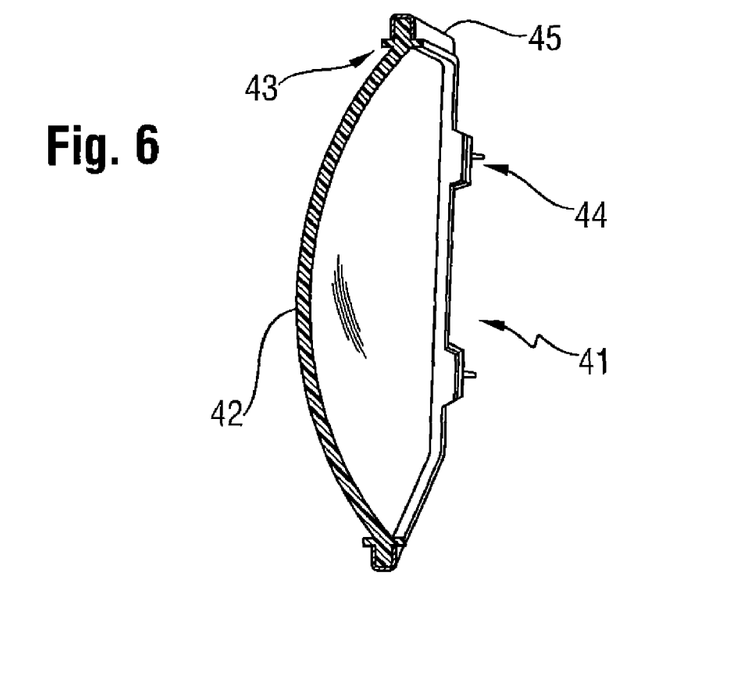
FIG. 6 is a cross sectional view of a baffle according to the invention with a non planar shape of the carrier.

FIG. 6 is a cross sectional view of the baffle shown in FIG. 5 along the axis B-B (which need not coincide with line BB' of FIG. 2). This figure shows the non planar central section of the carrier 41 with the curvature extending to the point 42. The heat expandable material 45 is mounted around the perimeter flange 43. The fasteners 44 are shown in the background.

Figure 7:
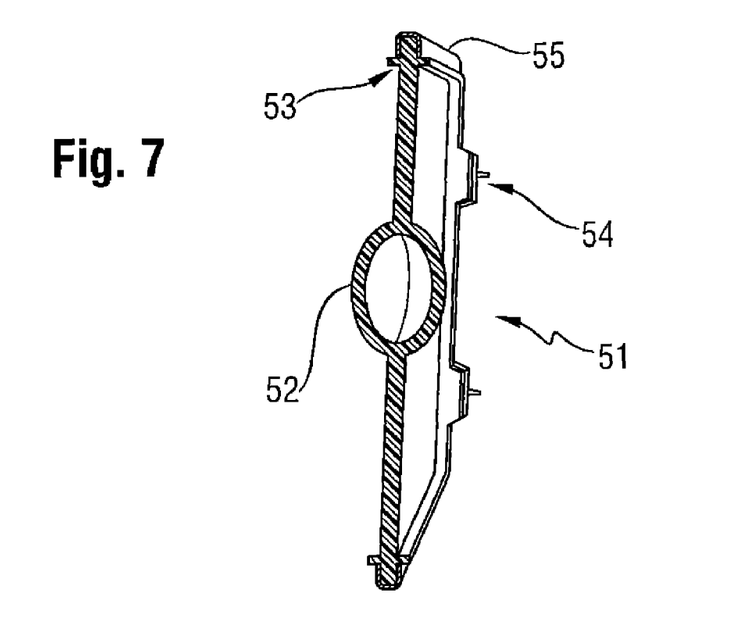
FIG. 7 shows a cross sectional view of a carrier with lumped mass distribution.

FIG. 7 shows the baffle with a planar section of the carrier plate 51 which has a lumped mass 52 arranged in the central portion of the carrier plate. Again, the flange 53 of the perimeter holds the heat expandable material 55. The fasteners 54 are shown in the background.

The efficiency of an activated cavity filler insert can be measured using the normal Sound Transmission Loss (STL), which corresponds to the ratio of the incident acoustic power "$P_{inc}$" inside the cavity up-stream of the insert divided by the radiated power "$P_{rad}$" down-stream of the insert. The Sound Transmission Loss is expressed in dB:

$$STL = 10 \log\{P_{inc}/P_{rad}\}$$

Inserts which have a higher STL value are more efficient in dampening sound.

The lowest STL value (minimum value) is observed at the first vibration resonance of the insert. This low value can be close to 0 dB, which means no sound insulation around this frequency. The objective of the present invention is to avoid this weakness by increasing the STL at this specific frequency range.

Figure 8:
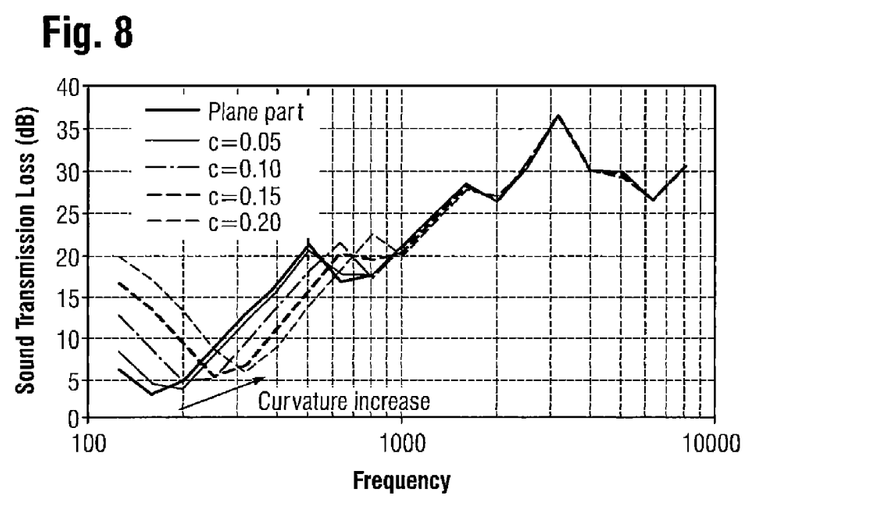
FIG. 8 shows a graph of sound transmission losses (STL) from baffles with increasing curvature ratio.

FIG. 8 shows the sound transmission loss over the frequency in dependence from the curvature ratio c=h/R (as defined further above in this specification, in the figure shortly named "curvature") of the non planar carrier plates in comparison to a standard flat design (circle part, diameter 100 mm, c=0). The STL deep ("trough" or minimum value) of a planar baffle (c=0) is located at low frequencies around 150 Hz. This corresponds to the resonance frequency of the first vibration mode. With increased curvature ratio c of the carrier plate of the baffle, the resonance frequency of the first vibration mode of the carrier plate is shifted to higher frequencies and the sound transmission loss is significantly improved by about 3 dB.

Figure 9:
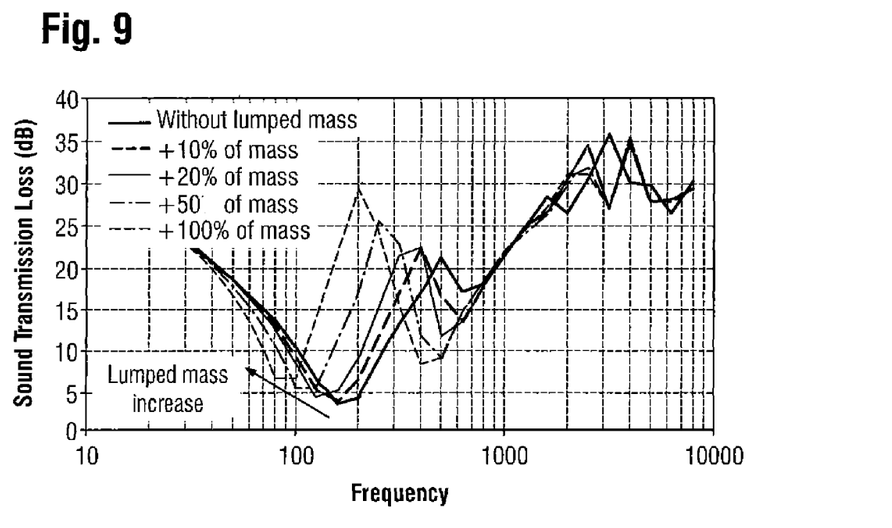
FIG. 9 shows a graph of sound transmission losses of baffles with different amounts of lumped mass distribution.

FIG. 9 shows the effect of a planar carrier plate with lumped mass. The resonance frequency without lumped mass (which means 0% of additional mass as compared with the average mass) is the highest and the sound transmission loss is significantly lower than for carriers with a lumped mass. With increasing amount of lumped mass (=additional mass), the resonance frequency is shifted to lower frequencies and the sound transmission loss is improved by about 3 dB (0% lumped mass vs. 100% lumped mass).

Figure 10:
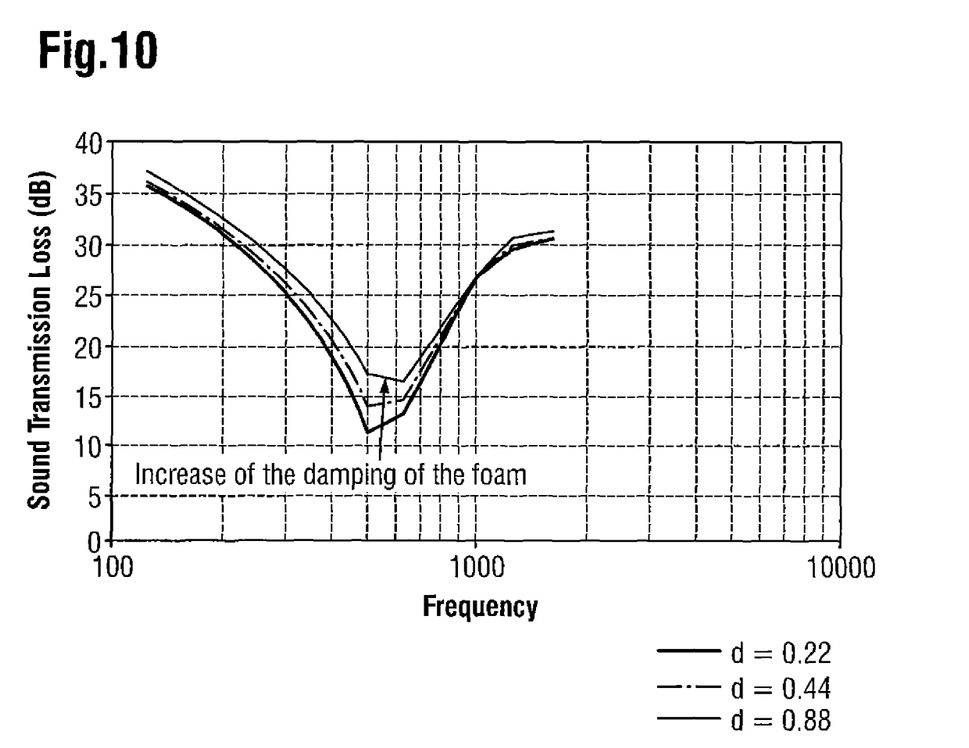
FIG. 10 shows a graph of sound transmission losses depending on the damping of the foam of the expandable material.

FIG. 10 shows the influence of the damping factor d of the heat expandable material in the expanded form on the STL. The higher the damping factor, the higher the sound transmission loss, e.g. about 17 dB for a heat expandable material with a damping factor of 0.88 vs. an STL of about 11 dB for a heat expandable material with a damping factor of 0.22. The resonance frequency is not significantly affected by the materials with different damping factors.

In particularly preferred embodiments of the invention, all three factors can be combined by using a carrier with a high curvature ratio which additionally has at the central portion a lumped mass and where the heat expandable material has a damping factor of at least 0.7 to 0.9.

What is claimed is:

1. A heat expandable baffle for sealing an automotive cavity formed by interconnected walls, the baffle comprising:
    a) a carrier plate having a linear length, an outer perimeter defining a mean plane limited by the outer perimeter and a strand of a heat expandable material laid along a major part of the outer perimeter, said strand circumscribing a central section of the carrier plate, said central section not being covered by the heat expandable material;
    wherein the central section of the carrier plate has a convex upper surface and a concave lower surface and extends out of the mean plane such that a point on the central section that is furthest from the mean plane lies at a distance from the mean plane which is at least 5% of a maximum of said linear length of the carrier plate; and
    b) optionally, one or more fasteners which may penetrate a wall of the cavity for fixing the baffle.

2. A heat expandable baffle according to claim 1 wherein the baffle further comprises a support structure along the outer perimeter, said support structure holding the strand of the heat expandable material.

3. A heat expandable baffle according to claim 1, wherein the central section of the carrier plate extends out of the mean plane in such a way that the point on the central section which has the greatest distance from the mean plane lies at a distance from the mean plane which is at least 5%, but not more than 50% of the maximum linear length of the carrier plate.

4. A heat expandable baffle according to claim 1, wherein the central section of the carrier plate extends in a direction out of the mean plane such that a vault-like structure is formed.

5. A heat expandable baffle according to claim 1, wherein the heat expandable material has a damping factor of 0.2 or more in expanded form.

6. A heat expandable baffle according to claim 2, wherein the support structure of the carrier plate includes a radial groove in which the heat expandable material is received.

7. A heat expandable baffle according to claim 2, wherein the support structure of the carrier plate includes a radial flange to which the heat expandable material is mounted.

8. A heat expandable baffle according to claim 2, wherein the heat expandable material is integrally molded to the support structure of the carrier plate.

9. A heat expandable baffle according to claim 1, wherein the carrier plate is made of a thermoplastic having a melting point higher than the expansion temperature of the heat expandable material.

10. A heat expandable baffle according to claim 1, wherein said baffle comprises at least one fastener for securing the baffle inside a cavity to be sealed.

11. A heat expandable baffle according to claim 1, wherein the carrier plate comprises polyamide.

12. A heat expandable baffle according to claim 1, wherein the heat expandable material comprises: a. an ethylene-copolymer, b. a blowing agent, c. optionally a tackifier and d. optionally an additive polymer or oligomer and crosslinking agent.

13. A heat expandable baffle according to claim 1, wherein the carrier plate has essentially the same thickness everywhere.

14. A heat expandable baffle according to claim 1, wherein the central section of the carrier plate has a curvature ratio of from 0.05 to 0.5.

15. A heat expandable baffle according to claim 1, wherein the central section of the carrier plate has a curvature ratio of greater than 0.2.

16. A heat expandable baffle according to claim 1, wherein the central section of the carrier plate has the shape of a sphere.

17. A heat expandable baffle according to claim 1, wherein the central section of the carrier plate has the shape of an ellipsoid.

18. A heat expandable baffle according to claim 1, wherein a hole is present in the central section of the carrier plate.

19. A heat expandable baffle according to claim 1, wherein a lumped mass is present at the central section of the carrier plate.

20. A heat expandable baffle for sealing an automotive cavity formed by interconnected walls, the baffle comprising:
    a) a carrier plate having a linear length, an outer perimeter defining a mean plane limited by the outer perimeter and a strand of a heat expandable material laid along a major part of the outer perimeter, said strand circumscribing a central section of the carrier plate, said central section not being covered by the heat expandable material and having a mass and an uneven mass distribution as a result of the central section having thicknesses which are different in various locations of the central section; and
    b) optionally, one or more fasteners which may penetrate a wall of the cavity for fixing the baffle.

21. A heat expandable baffle according to claim 20 wherein the baffle further comprises a support structure along the outer perimeter, said support structure holding the strand of the heat expandable material.

22. A heat expandable baffle according to claim 20, wherein the heat expandable material has a damping factor of 0.2 or more in expanded form.

23. A heat expandable baffle according to claim 21, wherein the support structure of the carrier plate includes a radial groove in which the heat expandable material is received.

24. A heat expandable baffle according to claim 21, wherein the support structure of the carrier plate includes a radial flange to which the heat expandable material is mounted.

25. A heat expandable baffle according to claim 21, wherein the heat expandable material is integrally molded to the support structure of the carrier plate.

26. A heat expandable baffle according to claim 20, wherein the carrier plate is made of a thermoplastic having a melting point higher than the expansion temperature of the heat expandable material.

27. A heat expandable baffle according to claim 20, wherein the carrier plate comprises polyamide.

28. A heat expandable baffle according to claim 20, wherein the heat expandable material comprises: a. an ethylene-copolymer, b. a blowing agent, c. optionally a tackifier and d. optionally an additive polymer or oligomer and crosslinking agent.

29. A heat-expandable baffle according to claim 20, wherein the concentrated part of the mass of the central section is 2% to 50% of the mass of the central section of the carrier plate.

* * * * *